United States Patent
Tani et al.

(10) Patent No.: US 6,721,007 B1
(45) Date of Patent: Apr. 13, 2004

(54) THREE-DIMENSIONAL IMAGE CAPTURING DEVICE

(75) Inventors: Nobuhiro Tani, Tokyo (JP); Shuzo Seo, Saitama (JP); Shinichi Kakiuchi, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 09/547,909

(22) Filed: Apr. 11, 2000

(30) Foreign Application Priority Data

Apr. 13, 1999 (JP) .......................................... 11-105339

(51) Int. Cl.$^7$ ........................ H04N 3/14; H04N 5/232
(52) U.S. Cl. ..................... 348/296; 348/312; 348/314; 348/348; 350/5.01
(58) Field of Search .............................. 348/296, 207.1, 348/326, 322, 323, 312, 314, 348; 250/208.1; 396/120

(56) References Cited

U.S. PATENT DOCUMENTS

| | | | |
|---|---|---|---|
| 4,686,572 A | | 8/1987 | Takatsu |
| 5,081,530 A | * | 1/1992 | Medina ........................ 348/46 |
| 5,122,850 A | * | 6/1992 | Burkey ....................... 257/230 |
| 5,424,223 A | * | 6/1995 | Hynecek ...................... 438/59 |
| 5,461,419 A | * | 10/1995 | Yamada ....................... 348/302 |
| 6,097,022 A | * | 8/2000 | Merrill et al. ........... 250/208.1 |
| 6,628,335 B1 | * | 9/2003 | Numazaki et al. .......... 348/370 |

FOREIGN PATENT DOCUMENTS

| | | | |
|---|---|---|---|
| JP | 4351074 | | 12/1992 |
| WO | WO9701111 | * | 1/1997 |

OTHER PUBLICATIONS

S. Christie et al., Design and developmetn of a multi–detecting two–dimensional ranging sensor, Measurement of Science and Technology, 6 (1995) pp. 1301–1308.*

English Language Translation for JP Appln. No. 4–351074. (Abstract only).

* cited by examiner

*Primary Examiner*—Ngoc-Yen Vu
*Assistant Examiner*—Timothy J. Henn
(74) *Attorney, Agent, or Firm*—Greenblum & Bernstein, P.L.C.

(57) ABSTRACT

A three-dimensional image capturing device comprises an imaging device, such as a CCD, having a plurality of photo-diodes, a vertical transfer unit and a substrate. First and second electric charge discharging signals and an electric charge transfer signal are periodically output, respectively. Due to the first electric charge discharging signal, unwanted charge accumulated in the photo-diodes is discharged to the substrate. An output of the electric charge transfer signal is started before the end of the output of the first electric charge discharging signal, and ends after the start of the output of the second electric charge discharging signal. A reflected light beam, generated by a measurement subject due to a distance measuring light beam, is sensed by the photo-diodes. Due to the second electric charge discharging signal, the electric charge accumulation in the photo-diodes ends.

8 Claims, 10 Drawing Sheets

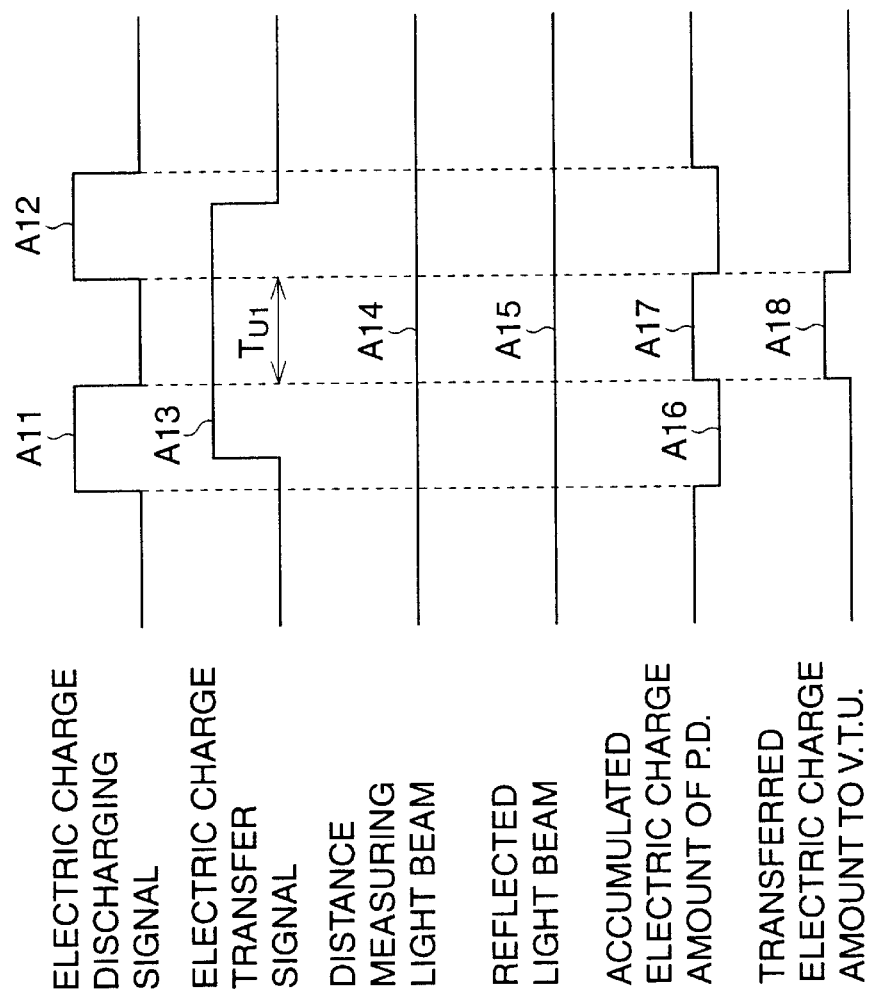

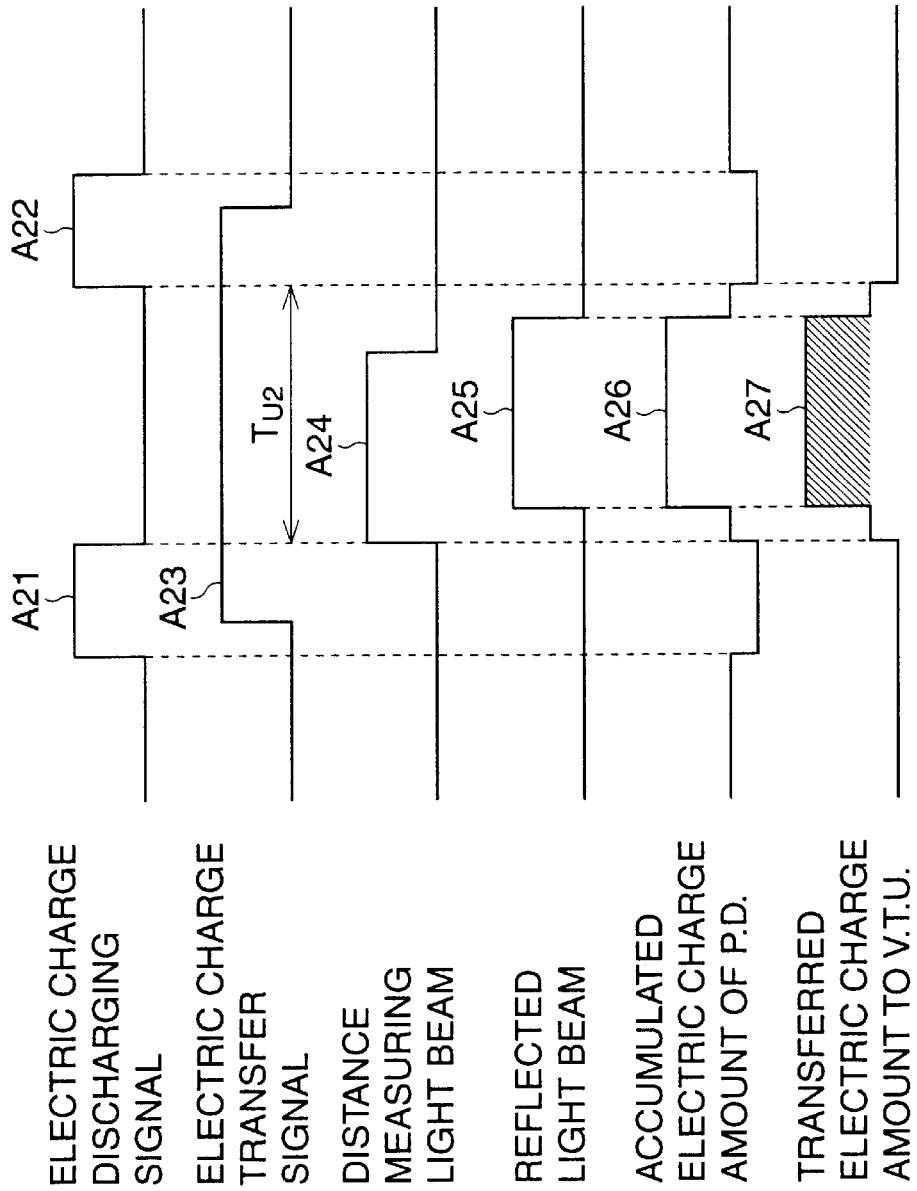

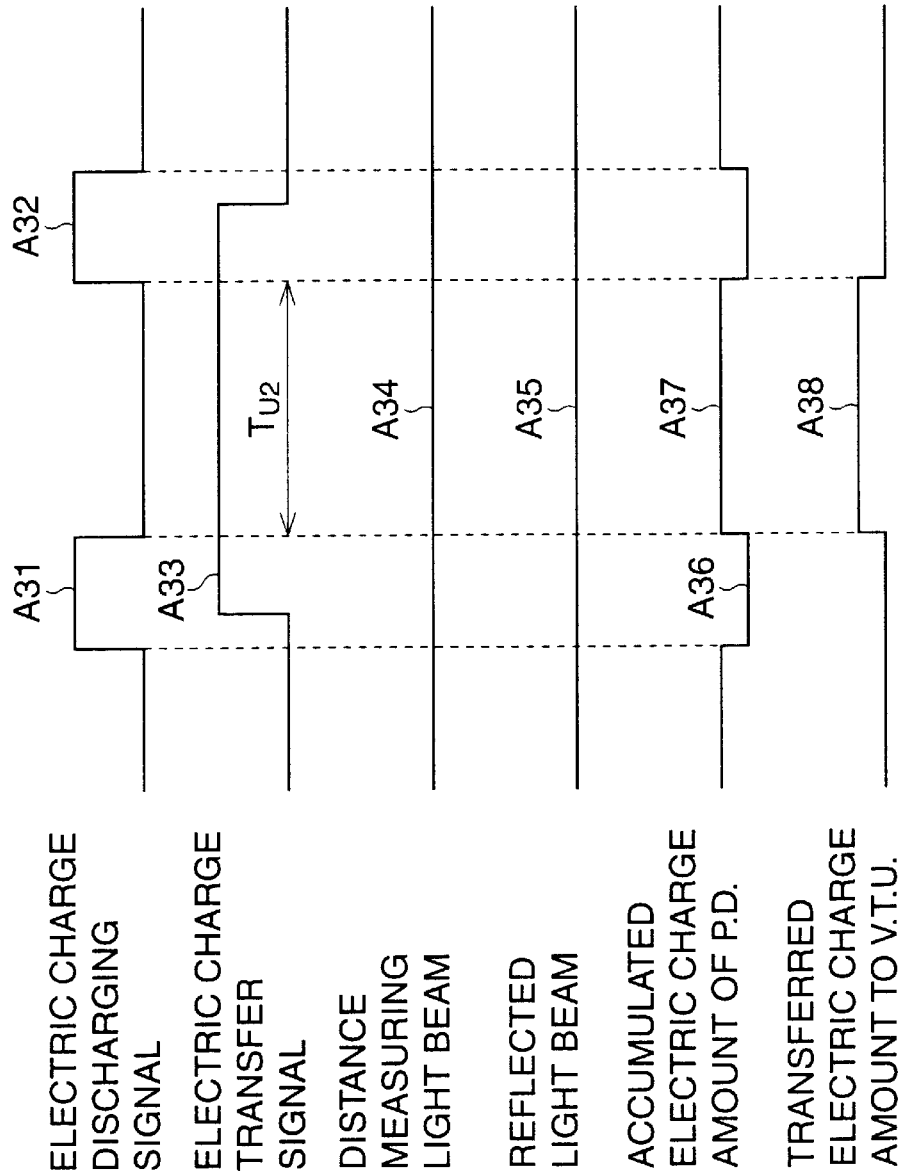

THREE-DIMENSIONAL IMAGE CAPTURING DEVICE

BACKGROUND OF THE INVENTION

1. Field of the Invention

The present invention relates to a three-dimensional image capturing device by which a three-dimensional shape of a measurement subject, which is to be measured, is captured by a time-of-flight measurement.

2. Description of the Related Art

A three-dimensional measurement using a three-dimensional image capturing device is classified as an active system, in which light, an electric wave or sound is radiated onto a measurement subject, or a passive system in which the light, electric wave or sound is not output. The active system comprises the time-of-flight measurement, a phase detection using a modulated light wave, a triangulation, a moire topography, and so on, and the passive system comprises a stereo vision system, and so on.

An active system device is bulky in comparison with that of the passive system, since the device requires a laser beam output mechanism. However, the active system device is superior regarding a distance measurement resolution, a measuring time, a measuring range and so on, and thus, despite its bulkiness, the device is utilized in various fields. In a three-dimensional image capturing device, described in "Measurement Science and Technology" (S. Christies et al., vol.6, p.1301–1308, 1995), a pulse-modulated laser beam irradiates a measurement subject, and a reflected light beam, which is reflected by the measurement subject, is received by a two-dimensional CCD sensor to which an image intensifier is attached, so that an image signal, corresponding to the reflected light beam, is converted to an electric signal. ON-OFF control of the image intensifier is carried out by a gate pulse, which is synchronized with the pulse radiation of the laser beam. According to the device, since an amount of received light, based on the reflected light beam from a measurement subject, which is positioned far from the device, is less than that of received light based on a reflected light beam from a measurement subject, which is close to the device, an output corresponding to a distance between the measurement subject and the device can be obtained for each pixel of the CCD.

In a device disclosed in International Publication No. WO 97/01111, light, such as a laser beam, which is pulse-modulated, irradiates a measurement subject, and a reflected light beam, which is reflected by the measurement subject, is received by a two-dimensional CCD sensor which is assembled with a mechanical shutter or an electro-optical shutter formed by a liquid crystal display, so that an image signal corresponding to the reflected light beam is converted to an electric signal. The shutter is controlled at a timing which is different from that of the laser beam, so that distance information of the measurement subject is obtained for each pixel of the CCD.

In the conventional three-dimensional image capturing device of an active system described above, an optical shutter, such as a KDP element, is provided so that an electric charge accumulating operation in the CCD sensor is controlled. However, not only is the optical shutter bulky, but also an electric circuit, which outputs a high voltage to drive the optical shutter, should be provided, and thus the conventional device becomes and remains bulky.

On the other hand, in U.S. Pat. No. 5,081,530, a device, in which an electronic shutter is provided for controlling an electric charge accumulating operation of a CCD sensor, is disclosed. However, an output of the CCD sensor, which is obtained by a single operation of the electronic shutter, is not great enough to sense distance information of the measurement subject.

SUMMARY OF THE INVENTION

Therefore, an object of the present invention is to provide a miniaturized three-dimensional image capturing device, which operates without an optical shutter, and by which an output sufficient to acquire three-dimensional distance information of the measurement subject is obtainable.

According to the present invention, there is provided a three-dimensional image capturing device, comprising a light source, a plurality of photoelectric conversion elements, a signal charge holding unit, an electric charge discharging processor, a signal charge transfer processor and a signal charge integrating processor.

The light source radiates a distance measuring light beam irradiating a measurement subject. The measurement subject reflects the distance measuring light beam to generate a reflected light beam. The plurality of photoelectric conversion elements receive the reflected light beam, so that electric charge corresponding to an amount of the received reflected light beam is accumulated in each of the photoelectric conversion elements. The signal charge holding unit is disposed adjacent to each of the photoelectric conversion elements. The electric charge discharging processor discharges unwanted charge accumulated in each of the photoelectric conversion elements, so that an accumulating operation of signal charge is started in each of the photoelectric conversion elements. The signal charge transfer processor transfers the signal charge accumulated in the photoelectric conversion elements to the signal charge holding unit. The signal charge integrating processor drives the electric charge discharging processor and the signal charge transfer processor in such a manner that first and second discharge operations of the electric charge discharging processor and a single transfer operation of the signal charge transfer processor are periodically performed, so that the signal charge is integrated in the signal charge holding unit. The transfer operation starts before the first discharge operation ends, and ends after the second discharging operation starts.

BRIEF DESCRIPTION OF THE DRAWINGS

The objects and advantages of the present invention will be better understood from the following description, with reference to the accompanying drawings in which:

FIG. 9 is a timing chart of a distance correction information sensing operation;

FIG. 10 is a timing chart of a reflectance information sensing operation; and

FIG. 11 is a timing chart of a reflectance correction information sensing operation.

DESCRIPTION OF THE PREFERRED EMBODIMENTS

Figure 1:
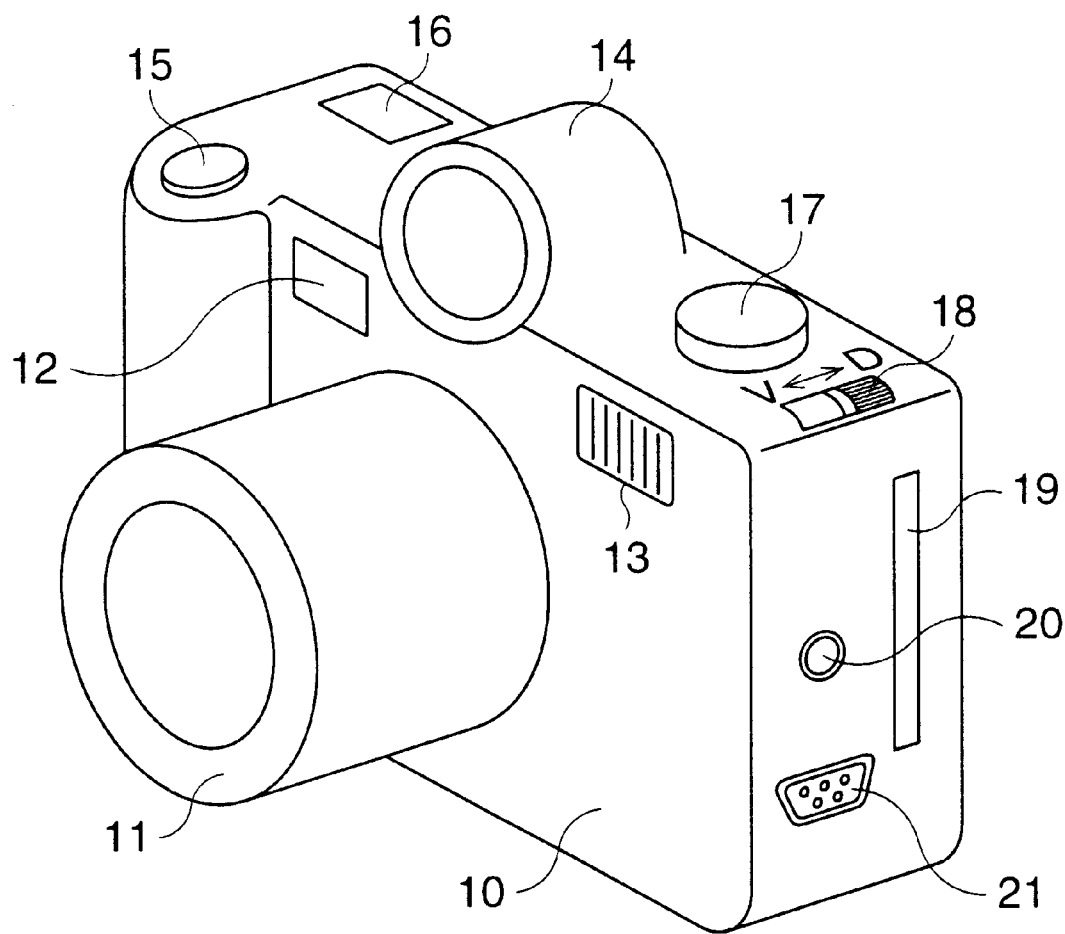
FIG. 1 is a perspective view showing a camera provided with a three-dimensional image capturing device of an embodiment of the present invention.

The present invention will be described below with reference to an embodiment shown in the drawings.

FIG. 1 is an external view of a camera having a three-dimensional image capturing device of an embodiment of the present invention.

On a front surface of a camera body 10, a view-finder window 12 is provided toward a left-upper edge, adjacent to a photographing lens 11, and an electronic flash 13 is disposed toward a right-upper edge. On an upper surface of the camera body 10, a light emitting device (i.e., a light source) 14, which radiates a laser beam (an infrared laser beam, for example, being a distance measuring light beam) is mounted above the photographing lens 11. A release switch 15 and a liquid crystal display panel 16 are provided on a left side of the light emitting device 14, and a mode change dial 17 and a V/D mode switch 18 are provided on a right side of the device 14. On a side surface of the camera body 10, a card slot 19 is formed into which a recording medium, such as an IC memory card, is insertable, and a video output terminal 20 and an interface connector 21 are also provided.

Figure 2:
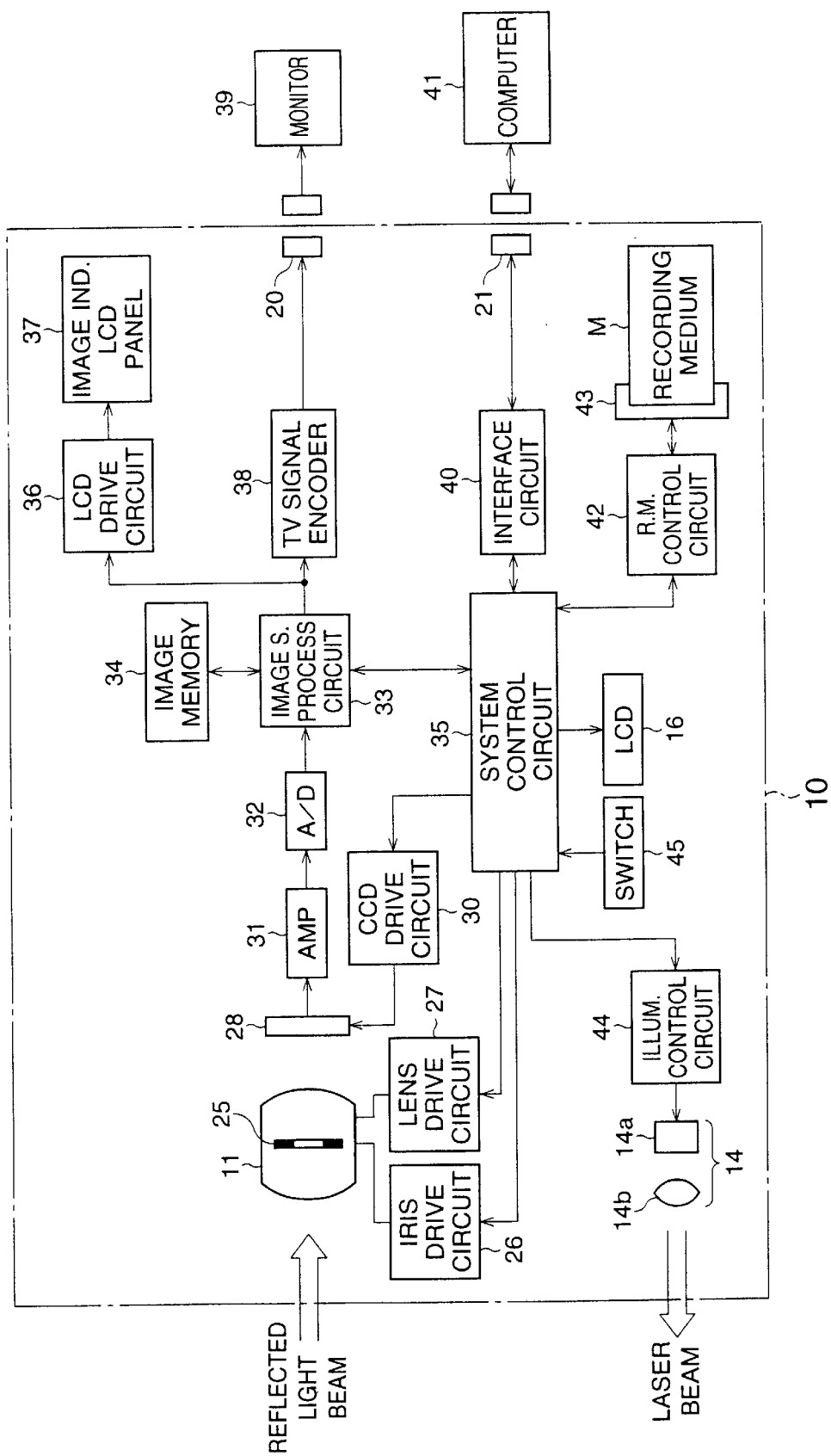
FIG. 2 is a block diagram showing an electrical construction of the camera shown in FIG. 1.

FIG. 2 is a block diagram showing an electrical construction of the camera of FIG. 1.

An aperture 25 is provided in the photographing lens 11. The opening degree of the aperture 25 is adjusted by an iris drive circuit 26. A focusing operation and a zoom operation of the photographing lens 11 are controlled by a lens drive circuit 27.

An imaging device (CCD) 28 is disposed on an optical axis of the photographing lens 11. A subject image is formed on a light receiving surface of the CCD 28 through the photographing lens 11, and an electric charge corresponding to the subject image is generated therein. An operation, such as an accumulating operation and a reading operation of the electric charge of the CCD 28, is controlled by a CCD drive circuit 30. An electric charge signal, i.e., an image signal, read from the CCD 28 is amplified by an amplifier 31, and is converted from an analog signal to a digital signal by an A/D converter 32. The digital image signal is subjected to a process, such as a gamma correction, in a image signal process circuit 33, and is stored as digital image data in an image memory 34. The iris drive circuit 26, the lens drive circuit 27, the CCD drive circuit 30 and the image signal process circuit 33 are controlled by a system control circuit 35.

The digital image data are read from the image memory 34, and supplied to an LCD drive circuit 36, which is operated in accordance with the digital image data, so that an image corresponding to the digital image data is indicated on an image indication LCD panel 37, which is provided on a rear surface of the camera body 10.

The digital image data read from the image memory 34 are also transmitted to a TV signal encoder 38, so that the digital image data can be transmitted to a peripheral monitor device 39, provided externally to the camera body 10, through the video output terminal 20. The system control circuit 35 is connected to an interface circuit 40, which in turn is connected to the interface connector 21. Therefore, the digital image data read from the image memory 34, can also be transmitted to a computer 41 connected to the interface connector 21. Further, the system control circuit 35 is connected to an image recording device 43 through a recording medium control circuit 42. Therefore, the digital image data read from the image memory 34 can be recorded in a recording medium M, such as an IC memory card, mounted in the image recording device 43.

A luminous-flux emitting element control circuit 44 is connected to the system control circuit 35. The light emitting device 14 is provided with a luminous-flux emitting element 14a and an illumination lens 14b, and an operation of the luminous-flux emitting element 14a is controlled by the luminous-flux emitting element control circuit 44. The luminous-flux emitting element 14a radiates a laser beam, which is a distance measuring light beam, and which irradiates a whole of a measurement subject through the illumination lens 14b. The laser beam, reflected by the measurement subject, becomes incident on the photographing lens 11. By detecting the laser beam with the CCD 28 provided with a plurality of photo-diodes, which are two-dimensionally disposed on a surface thereof, a three-dimensional image is sensed, as described later. Note that, in the sensing operation of the three-dimensional image, a control, including a timing control of a transferring operation of the CCD 28, is performed by the system control circuit 35 and the CCD drive circuit 30.

The liquid crystal display panel 16 and a switch group 45, including the release switch 15, the mode change dial 17 and the V/D mode switch 18, are connected to the system control circuit 35.

Figure 3:
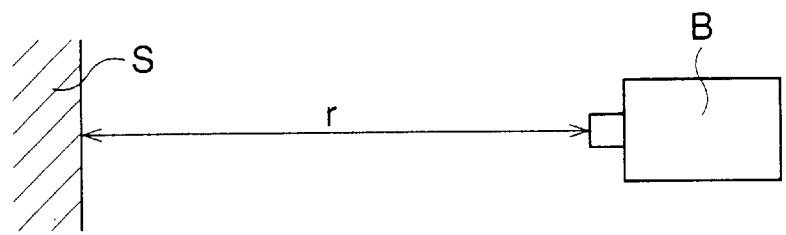
FIG. 3 is a view showing a principle behind a distance measurement.
Figure 4:
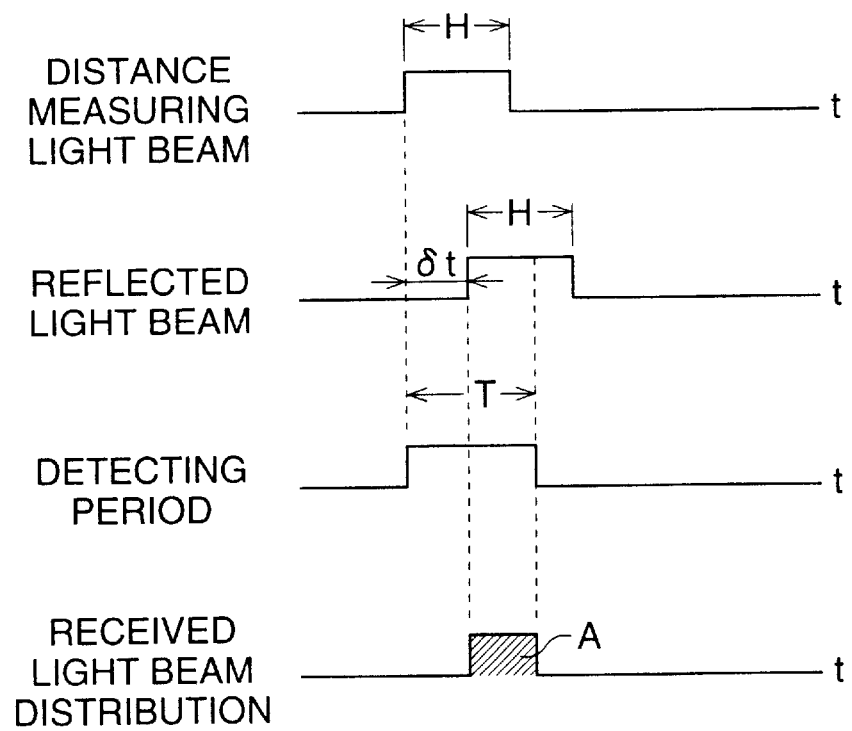
FIG. 4 is a timing chart showing a distance measurement light beam, a reflected light beam, a gate pulse and a distribution of an amount of a light beam received by a CCD.

With reference to FIGS. 3 and 4, a principle behind a distance measurement in the embodiment is described below. Note, in FIG. 4, the abscissa indicates time "t".

A distance measuring light beam output by a distance measurement device B is reflected by a measurement subject S, and the reflected light beam is sensed by a CCD (not shown). The distance measuring light beam is a pulse, the width of which is "H". Accordingly, the reflected light beam is a pulse, the width of which is "H", similarly to the distance measuring light beam. Therefore, a rise of the pulse of the reflected light beam occurs after a rise of the pulse of the distance measuring light beam by a time δ·t (δ is a delay coefficient). Since the distance measuring light beam and the reflected light beam have both traveled a distance "r" between the distance measurement device B and the measured subject S, the distance "r" is represented as follows:

$$r = \delta \cdot t \cdot C / 2 \quad (1)$$

wherein "C" is the velocity of light.

For example, by setting a condition in such a manner that the reflected light beam can only be sensed from a rise of the pulse of the distance measuring light beam to a point prior to a fall of the pulse of the reflected light beam, i.e., by providing a gate pulse corresponding to a reflected light beam detecting period T, an amount "A" of received light from the reflected light beam becomes a function of the distance "r". Namely, the greater the distance "r" (or the greater the time δ·t), the less the received light amount A.

In the embodiment, by taking advantage of the principle described above, the received light amount A is sensed using each of the photo-diodes (photoelectric conversion elements) of the CCD 28, the distance from the camera body 10 to each point on the surface of the measurement subject S is sensed, and data of the three-dimensional image, which indicates a topography of the measurement subject S, can be obtained concurrently.

Figure 5:
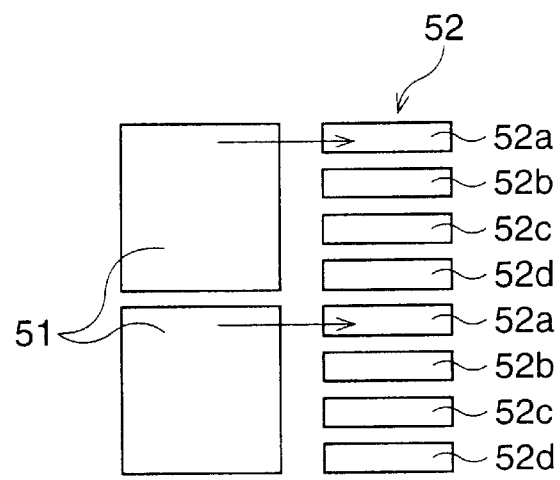
FIG. 5 is a plan view showing a disposition of photodiodes and a vertical transfer unit, which are provided in the CCD.
Figure 6:
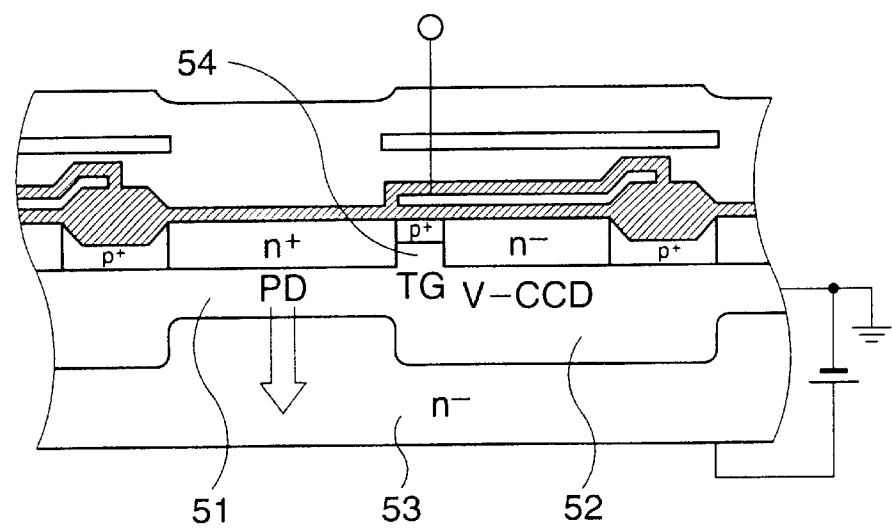
FIG. 6. is a sectioned elevational view of the CCD.

FIG. 5 is a plan view showing a disposition of the photo-diodes 51 and a vertical transfer unit 52, which are provided in the CCD 28. Actually, a multitude of photo-diodes 51 are arranged in a matrix, and a corresponding vertical transfer unit 52 is disposed beside each vertical column of photo-diodes 51. FIG. 6 is a sectioned elevational view of the CCD 28 in which the CCD 28 is cut by a plane perpendicular to a substrate 53. The CCD 28 is an interline CCD of vertical overflow drain (VOD) type, in which unwanted charge is discharged to the substrate 53.

The photo-diodes 51 and the vertical transfer unit (signal charge holding unit) 52 are formed along a surface of the n-type substrate 53. A plurality of the photo-diodes 51 are two-dimensionally disposed in a matrix arrangement, and the vertical transfer unit 52 is disposed adjacent to the photo-diodes 51, parallel to rows extending in a vertical direction in FIG. 5. The vertical transfer unit 52 has four vertical transfer electrodes 52a, 52b, 52c and 52d, which correspond to each of the photo-diodes 51. Therefore, in the vertical transfer unit 52, four potential wells can be formed, so that a signal charge is output from the CCD 28 by controlling a depth of the wells, as is well known. Note that a number of the vertical transfer electrodes can be changed, depending upon the requirement of the CCD 28.

The photo-diodes (PD) 51 and the vertical transfer unit (V-CCD being signal charge holding unit) 52 are disposed in a p-type well formed on a surface of the substrate 53. The p-type well is completely depleted due to an inverse bias voltage applied between the p-type well and the n-type substrate 53. In this state, electric charge is accumulated in the photo-diodes 51, and an amount of the electric charge corresponds to an amount of an incident light beam, which is the reflected light beam reflected by the measurement subject. When a substrate voltage is changed to a value greater than a predetermined value, electric charge accumulated in the photo-diodes 51 is discharged to the substrate 53. Conversely, when an electric charge transfer signal, which is a voltage signal, is applied to a transfer gate (TG) 54, the electric charge accumulated in the photo-diodes 51 is transferred to the vertical transfer unit 52. Namely, after the electric charge is discharged to the substrate 53 by the electric charge discharging signal, the signal charge accumulated in the photo-diode 51 is transferred to the vertical transfer unit 52 by the electric charge transfer signal. By repeating the discharge and the transfer, an electronic shuttering operation is performed.

Figure 7A:
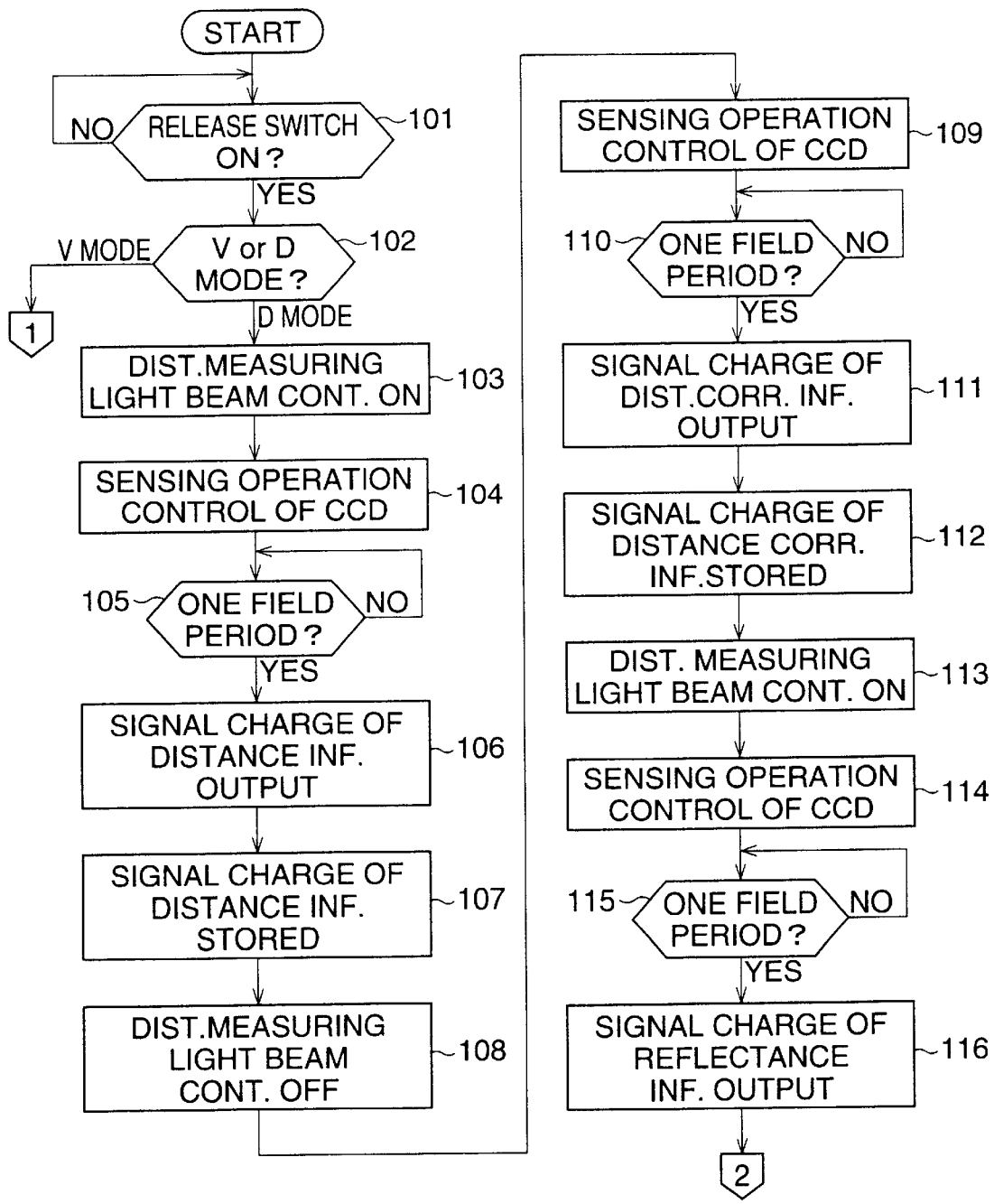
FIGS. 7A and 7B show a flowchart of the distance information sensing operation of the embodiment.
Figure 7B:
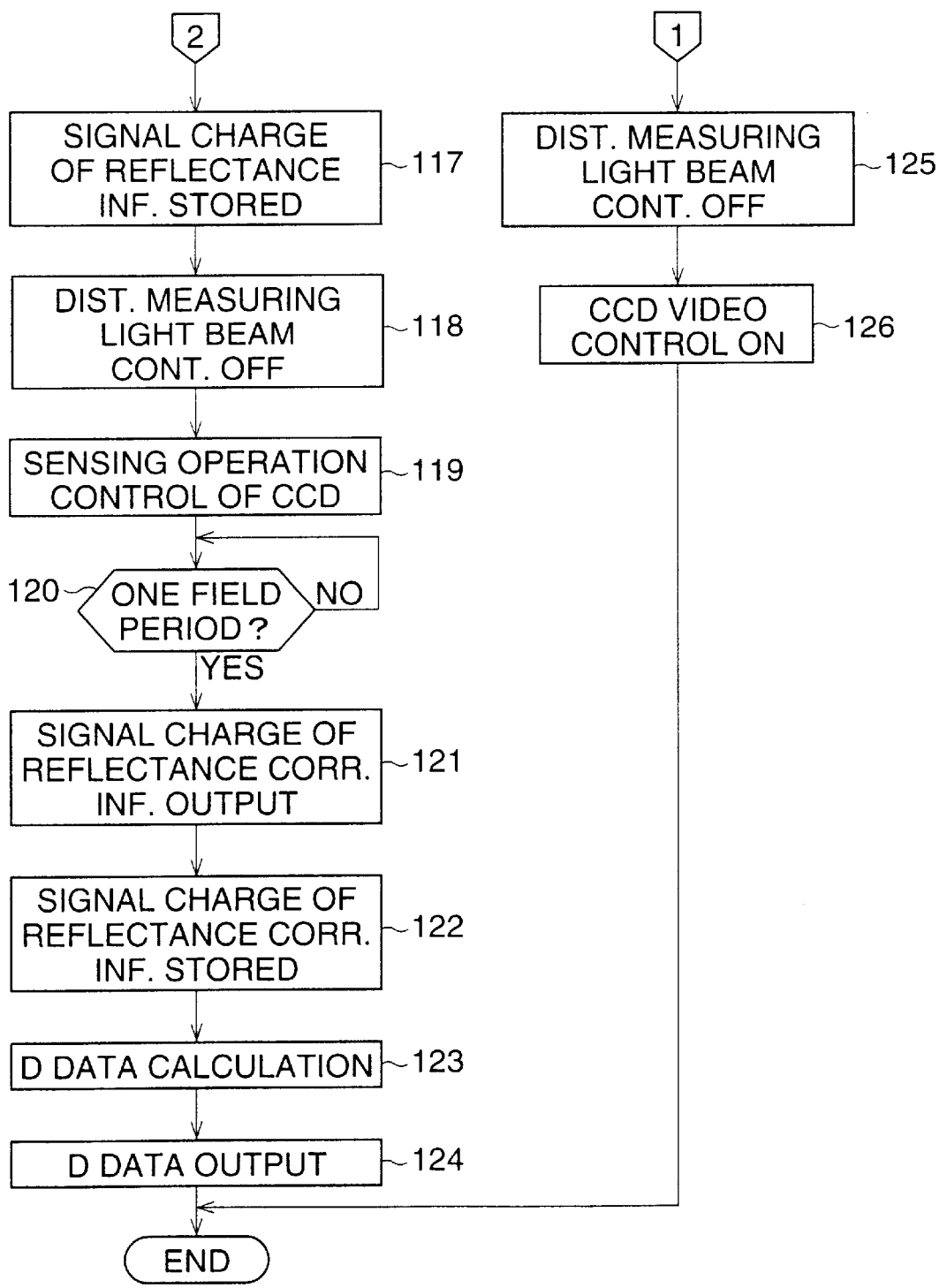

FIGS. 7A and 7B show a flowchart of a sensing operation by which data of the three-dimensional image regarding a surface shape of the measurement subject is sensed. FIGS. 8 through 11 are timing charts of the sensing operation. With reference to FIGS. 1, 2, 7A, 7B, 8 through 11, an operation of the embodiment is described below.

When it is recognized in Step 101 that the release switch 15 is fully depressed, Step 102 is executed in which it is determined which mode is selected, a video (V) mode or a distance measurement (D) mode. A change between the modes is carried out by operating the V/D mode switch 18.

Figure 8:
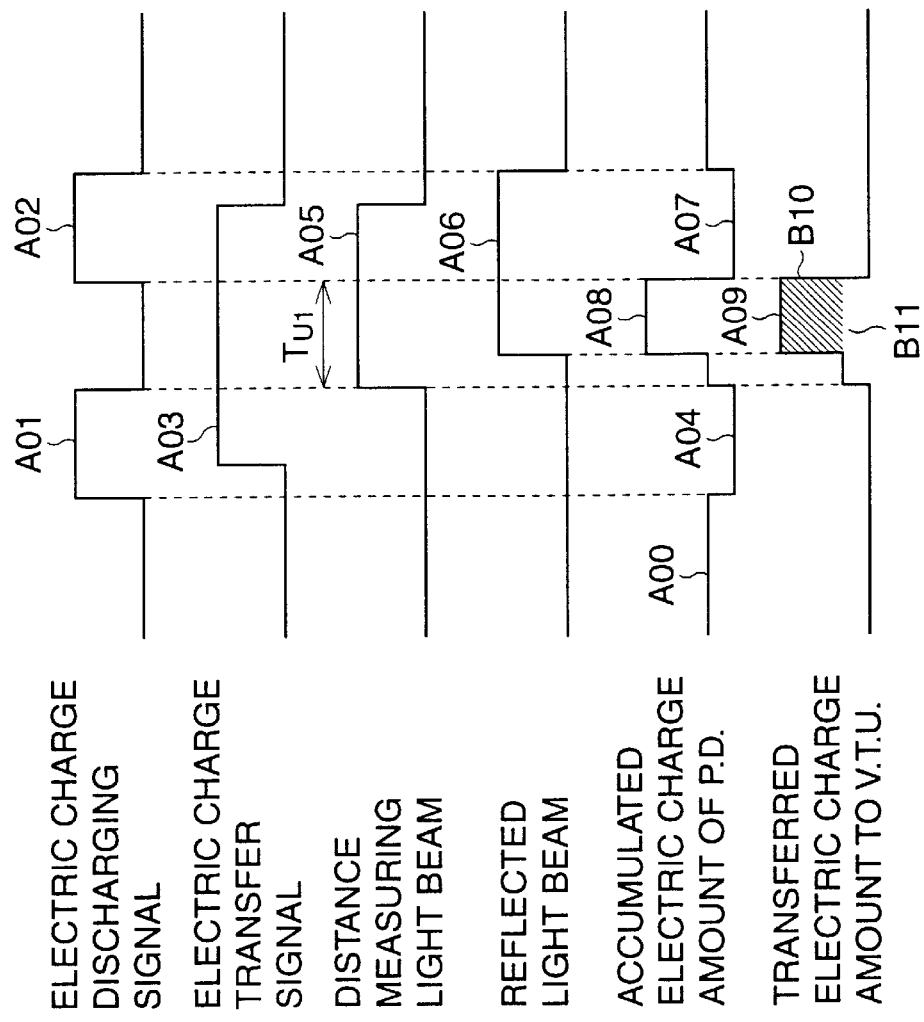
FIG. 8 is a timing chart of a distance information sensing operation.

When the D mode is selected, Step 103 and Steps following Step 103 are executed, and the distance information sensing operation shown in FIG. 8 is performed in Steps 103 through 107.

In Step 103, a distance measuring light beam control is started, so that a distance measuring light beam A05 is periodically output. In Step 104, a vertical synchronizing signal (not shown) is output, and then, two electric charge discharging signals (pulse signals) A01, A02, and a single electric charge transfer signal (a pulse signal) A03 are periodically output, respectively.

Due to the first electric charge discharging signal A01, unwanted charge A00, which is accumulated in the photo-diodes 51, is discharged to the substrate 53, so that the electric charge accumulating amount A04 becomes zero. An output of the electric charge transfer signal A03 is started while the first electric charge discharging signal A01 is output, so that electric charges accumulated in the photo-diodes 51 are transferred to the vertical transfer unit 52. However, the electric charge amount A04 is zero while the first electric charge discharging signal A01 is output, and thus, none is transferred to the vertical transfer unit 52.

The distance measuring light beam A05 is output approximately at the same time as when the output of the first electric charge discharging signal A01 ends. The distance measuring light beam A05 is reflected by the measurement subject and enters the CCD 28, so that a reflected light beam A06 from the measurement subject is received by the CCD 28.

The second electric charge discharging signal A02 is output when a predetermined time has passed from the completion of the output of the first electric charge discharging signal A01, and the output of the electric charge transfer signal A03 ends while the second electric charge discharging signal A02 is output. Namely, the transferring operation by the electric charge transfer signal A03 is started when a first discharging operation is carried out by the first electric charge discharging signal A01, and is completed when a second discharging operation is carried out by the second electric charge discharging signal A02. Thus, output timings of the first and second electric charge discharging signals A01, A02 and the electric charge transfer signal A03 are set in such a manner that the receiving of the reflected light beam A06 is started between the end of the first discharging operation and the start of the second discharging operation, and ends after the start of the second discharging operation.

Due to the operation of the second electric charge discharging signal A02, the electric charge amount A07 of the photo-diodes 51 becomes zero. Therefore, due to the electric charge transfer signal A03, electric charge A08, accumulated in the photo-diodes 51 for a period from the end of the first discharging operation by the first electric charge discharging signal A01 to the beginning of the second discharging operation by the second electric charge discharging signal A02, i.e., for an electric charge accumulating period $T_{U1}$, is transferred to the vertical transfer unit 52 as a signal charge A09. The signal charge A09 contains an electric charge B10 (hatched portion in FIG. 8) corresponding to a distance from the camera body to the measurement subject and an electric charge B11 (unhatched portion in FIG. 8) which occurs based on an extra component, such as ambient daylight.

When a predetermined time has passed after the end of the completion of the second electric charge transfer signal A02, the first electric charge discharging signal A01 is output, and then, the operation described above is repeated, so that the signal charge A09 is transferred to the vertical transfer unit 52.

The transferring operation of the signal charge A09 to the vertical transfer unit 52 is repeatedly performed until the next vertical synchronizing signal is output. Thus, the signal charge A09 is integrated in the vertical transfer unit 52. The signal charge A09 integrated for one field period, which is between two vertical synchronizing signals, corresponds to distance information of the measurement subject, on the condition that the measurement subject is stationary for the period between the two vertical synchronizing signals.

In Step 105, it is determined whether one field period has elapsed since the output of the vertical synchronizing signal in Step 104, i.e., whether a new vertical synchronizing signal has been output. When one field period has passed, the process goes to Step 106 in which the signal charge A09 of the distance information is output from the CCD 28. The signal charge A09 is then stored in the image memory 34 in Step 107. Then, in Step 108, the distance measuring light beam is turned OFF, and thus the light emitting operation of the light emitting device 14 is stopped.

The detecting operation of the signal charge A09 described above is carried out in all of the photo-diodes 51 provided in the CCD 28. As a result of the detecting operation for one field period, the distance information sensed by the photo-diodes 51 is held in each corresponding vertical transfer unit 52, which is located adjacent to each column of photo-diodes 51. The distance information is output from the CCD 28 by a vertical transferring operation of the vertical transfer units 52 and a horizontal transferring operation of a horizontal transfer unit (not shown). The distance information is then output from the three-dimensional image capturing device, as a three-dimensional image data of the measured subject. Note that a distance range which can be measured by the camera corresponds to a period (i.e., the electric charge accumulating period $T_{U1}$) from a drop of the first electric charge discharging signal A01 to a rise of the second electric charge discharging signal A02.

In Steps 109 through 112, the distance correction information sensing operation, shown in FIG. 9, is performed. In Step 109, a vertical synchronizing signal (not shown) is output, and a sensing operation control of the CCD 28 is started. Namely, first and second electric charge discharging signals A11, A12 and an electric charge transfer signal A13 are periodically output while the light emitting operation of the light emitting device 14 is not carried out, i.e., while the light source is not illuminated.

Output timings of the electric charge discharging signals A11, A12 and the electric charge transfer signal A13 are the same as those of the electric charge discharging signals A01, A02 and the electric charge transfer signal A03 of the distance information sensing operation (FIG. 8). Namely, the electric charge accumulation period $T_{U1}$ is the same as that of the distance information sensing operation. In the distance correction information sensing operation, however, since the distance measuring light beam is not radiated (reference A14), there is no reflected light beam (reference A15). Therefore, in the photo-diodes 51, after the electric charge amount becomes zero due to the first electric charge discharge signal A11 (reference A16), although a signal charge of the distance information is not generated, since a signal charge corresponding to an interference or noise component, such as ambient daylight, is generated, an electric charge corresponding to the noise component is accumulated (reference A17).

The accumulated electric charge, which is a signal charge A18, is transferred to the vertical transfer unit 52 by the electric charge transfer signal A13. Namely, the signal charge A18 corresponds to the electric charge B11 based on the noise component contained in the signal charge A09 which is sensed in the distance information sensing operation, and is distance correction information.

In Step 110, it is determined whether one field period has elapsed since the beginning of the distance correction information sensing operation, i.e., whether a new vertical synchronizing signal has been output. When one field period has passed, the process goes to Step 111 in which the signal charge A18 of the distance correction information is output from the CCD 28. The signal charge A18 is then stored in the image memory 34 in Step 112. Thus, in the distance correction information sensing operation, similarly to the distance information sensing operation, the transferring operation of the signal charge A18 to the vertical transfer unit 52 is repeatedly performed until the next vertical synchronizing signal is output, so that the signal charge A18 is integrated in the vertical transfer unit 52.

In Steps 113 through 117, the reflectance information sensing operation shown in FIG. 10 is performed. In Step 113, a vertical synchronizing signal (not shown) is output, and a distance measuring light beam control of the CCD 28 is started, so that a distance measuring light beam A24 is intermittently output. In Step 114, a sensing operation control of the CCD 28 is started, and thus first and second electric charge discharging signals A21, A22 and an electric charge transfer signal A23 are periodically output.

The output interval between the electric charge discharging signals A21 and A22, and the output period of the electric charge transfer signal A23 are longer than those of the distance information sensing operation (FIG. 8) and the distance correction information sensing operation (FIG. 9), respectively. Namely, in the reflectance information sensing operation, all of the reflected light beam A25 is received within an electric charge accumulation period $T_{U2}$, which is from an end of an output of the first electric charge discharging signal A21 to a beginning of an output of the second electric charge transfer signal A22, and all of the electric charge A26 accumulated in each of the photo-diodes 51 is transferred to the vertical transfer unit 52 as a signal charge A27. The signal charge A27 does not depend upon the distance of the measurement subject, and corresponds only to the reflectance information which depends on the reflectance of the surface of the measurement subject.

In Step 115, it is determined whether one field period has elapsed since the beginning of the reflectance information sensing operation, i.e., whether a new vertical synchronizing signal has been output. When one field period has passed, the process goes to Step 116 in which the signal charge A27 of the reflectance information is output from the CCD 28. The signal charge A27 is then stored in the image memory 34 in Step 117. Then, in Step 118, the distance measuring light beam is turned OFF, and thus the light emitting operation of the light emitting device 14 is stopped.

Thus, in the reflectance information sensing operation, similarly to the distance information sensing operation, the transferring operation of the signal charge A27 to the vertical transfer unit 52 is repeatedly performed until the next vertical synchronizing signal is output, so that the signal charge A27 is integrated in the vertical transfer unit 52.

In Steps 119 through 122, the reflectance correction information sensing operation shown in FIG. 11 is performed. In Step 119, a vertical synchronizing signal (not shown) is output, and a sensing operation control of the CCD 28 is started. Namely, first and second electric charge discharging signals A31, A32 and an electric charge transfer signal A33 are periodically output while the light emitting operation of the light emitting device 14 is not carried out.

Output timings of the electric charge discharging signals A31, A32 and the electric charge transfer signal A33 are the same as those of the electric charge discharging signals A21, A22 and the electric charge transfer signal A23 of the reflectance information sensing operation (FIG. 10).

Namely, the electric charge accumulation period $T_{U2}$ is the same as that of the reflectance information sensing operation. In the reflectance correction information sensing operation, however, since the distance measuring light beam is not radiated (reference A34), there is no reflected light beam (reference A35). Therefore, in the photo-diodes 51, after the electric charge amount becomes zero due to the first electric charge discharge signal A31 (reference A36), although a signal charge of the reflectance information is not generated, an electric charge A37 corresponding to an interference or noise component, such as ambient daylight, is accumulated. The accumulated electric charge, which is a signal charge A38, is transferred to the vertical transfer unit 52 by the electric charge transfer signal A33. Namely, the signal charge A38 corresponds to reflectance correction information by which an influence, in which the noise component affects the reflectance information, is corrected.

In Step 120, it is determined whether one field period has elapsed since the beginning of the reflectance correction information sensing operation, i.e., whether a new vertical synchronizing signal has been output. When one field period has passed, the process goes to Step 121 in which the signal charge A38 of the reflectance correction information is output from the CCD 28. The signal charge A38 is stored in the image memory 34 in Step 122.

Thus, in the reflectance correction information sensing operation, similarly to the distance information sensing operation, the transferring operation of the signal charge A38 to the vertical transfer unit 52 is repeatedly performed until the next vertical synchronizing signal is output, so that the signal charge A38 is integrated in the vertical transfer unit 52.

In Step 123, a calculation process of the distance measurement (D) data is performed using the distance information, the distance correction information, the reflectance information and the reflectance correction information, which are obtained in Steps 103 through 122. The D data is output in Step 124, and the sensing operation ends.

Conversely, when it is determined in Step 102 that the V mode is selected, the distance measuring light beam is turned OFF in Step 125, and a normal photographing operation (i.e., CCD video control) using the CCD 28 is turned ON. Then, the sensing operation ends.

The contents of the calculation executed in Step 123 are described below, with reference to FIGS. 8 through 11.

The signal charge A09 (FIG. 8) sensed by the distance information sensing operation is distance information corresponding to a distance from the camera body to the measurement subject, and is supposed to be S10. Although the three-dimensional shape of the measurement subject can be obtained using the distance information, the distance information contains an error component caused by an interference or noise component, and other error component caused by a reflectance of a surface of the measurement subject. Therefore, in Step 123, for improving the measurement accuracy of the three-dimensional shape, the distance information is corrected using the distance correction information, the reflectance information and the reflectance correction information.

The signal charge A18 (FIG. 9) sensed by the distance correction information sensing operation, i.e. the distance correction information sensed by the same process as that of the distance information S10, with the light emitting device 14 being turning OFF, is supposed to be S11. The signal charge A27 (FIG. 10) sensed by the reflectance information sensing operation, i.e. the reflectance information depending upon the reflectance of the measurement subject is supposed to be S20. The signal charge A38 (FIG. 11) sensed by the reflectance correction information sensing operation, i.e. the reflectance correction information sensed by the same process as that of the reflectance information sensing operation, with the light emitting device 14 being turning OFF, is supposed to be S21. The normalized distance information SD is obtained by the following formula, based on the information S10, S11, S20 and S21.

$$SD=(S10-S11)/(S20-S21)$$

Thus, the normalized distance information SD is obtained by dividing a first value, in which the first error component derived from a noise is subtracted from the distance information S10, by a second value, in which the second error component derived from a noise is subtracted from the reflectance information S20.

Thus, based on the formula above described, the distance information from the camera body to each point on the surface of the measurement subject is corrected, so that an accuracy of a distance sensing is improved.

As described above, according to the embodiment, since an optical shutter need not be provided, the three-dimensional image capturing device can be miniaturized and manufactured at a low cost. Further, the embodiment is constructed in such a manner that a plurality of electric charge discharging signals (pulse signals) are output to integrate the signal charge A09 so that distances, from the camera body to the measurement subject, are sensed concurrently. Therefore, an output signal of the three-dimensional image capturing device can have a higher level (output signal), in comparison with a conventional device, and distance information, which does not contain noise and has a high accuracy, can be sensed.

Furthermore, according to the embodiment, the distance information, which is three-dimensional image data regarding the topography of the measurement subject, is detected and accumulated concurrently without a need for scanning the distance measuring light beam over the measurement subject. Further, the embodiment is constructed in such a manner that the signal charge is transferred to the vertical transfer unit 52 simultaneously with the electric charge accumulating operation of the photo-diodes 51, so that the pulse interval of the distance measuring light beam can be set as short as possible. Accordingly, a time over which the three-dimensional image of the measurement subject is obtained can be drastically shortened.

The reflected light beam, sensed by the CCD 28 may be affected by a reflectance of the surface of the measurement subject. Therefore, the distance information, obtained through the reflected light beam, may contain an error resulting from the reflectance. Further, the reflected light beam sensed by the CCD 28 may contain an extra component, such as ambient daylight, being other than the reflected light beam from the measurement subject, which can cause an error. However, according to the embodiment, such errors become correctable, so that three-dimensional image data regarding the topography of the measurement subject is detected with a high accuracy.

Furthermore, according to the embodiment, by adjusting an output interval between the first and second electric charge discharging signals, the electric charge accumulating period, i.e. an electronic shutter, can be set, and thus the distance range, within which a distance to the measurement subject can be detected, is easily adjusted.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 11-105339 (filed on Apr. 13, 1999) which is expressly incorporated herein, by reference, in its entirety.

What is claimed is:

1. A three-dimensional image capturing device, comprising:
   a light source that radiates a distance measuring light beam irradiating a measurement subject, said measurement subject reflecting said distance measuring light beam to generate a reflected light beam;
   a plurality of photoelectric conversion elements that receive said reflected light beam, so that electric charge corresponding to an amount of said received reflected light beam is accumulated in each of said photoelectric conversion elements;
   a signal charge holding unit disposed adjacent to each of said photoelectric conversion elements;
   an electric charge discharging processor that discharges unwanted charge accumulated in each of said photoelectric conversion elements, so that an accumulating operation of signal charge is started in each of said photoelectric conversion elements;
   a signal charge transfer processor that transfers said signal charge accumulated in said photoelectric conversion elements to said signal charge holding unit; and
   a signal charge integrating processor that drives said electric charge discharging processor and said signal charge transfer processor in such a manner that first and second discharge operations of said electric charge discharging processor and a single transfer operation of said signal charge transfer processor are periodically performed, so that said signal charge is integrated in said signal charge holding unit, said transfer operation starting before said first discharge operation ends, and ending after said second discharging operation starts.

2. The device according to claim 1, wherein said transfer operation starts while said first discharging operation is carried out, and said transfer operation ends while said second discharging operation is carried out.

3. The device according to claim 1, wherein said photoelectric conversion elements start receiving said reflected light beam between the end of said first discharging operation and the beginning of said second discharging operation, and stops receiving said reflected light beam after the beginning of said second discharging operation, so that said signal charge is integrated to sense distance information regarding said measurement subject.

4. The device according to claim 3, wherein said signal charge integrating processor drives said signal charge discharging processor and said signal charge transfer processor at a timing the same as that of an operation by which said distance information is sensed, while said light source is turned OFF, so that distance correction information is sensed, said signal charge integrating processor drives said signal charge discharging processor and said signal charge transfer processor in such a manner that said photoelectric conversion elements receive all of said reflected light beam, so that reflectance information is sensed, and said signal charge integrating processor drives said signal charge discharging processor and said signal charge transfer processor at a timing the same as that of an operation by which said reflectance information is sensed, while said light source is turned OFF, so that reflectance correction information is sensed.

5. The device according to claim 4, wherein normalized distance information SD is obtained by the following formula, $$SD=(S10-S11)/(S20-S21)$$

wherein said distance information is S10, said distance correction information is S11, said reflectance information is S20, and said reflectance correction information is S21.

6. The device according to claim 1, wherein said photoelectric conversion elements are formed on a substrate, and said electric charge discharging processor discharges said unwanted charge to said substrate.

7. The device according to claim 1, wherein said signal charge holding unit is provided in a vertical transfer unit that outputs said signal charge from said three-dimensional image capturing device.

8. The device according to claim 1, wherein said photoelectric conversion elements and said signal charge holding units are formed as a vertical overflow drain type of interline CCD.

* * * * *